(12) United States Patent
Kang

(10) Patent No.: US 8,902,571 B2
(45) Date of Patent: Dec. 2, 2014

(54) DISPLAY DEVICE

(75) Inventor: Dae-Yeon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 262 days.

(21) Appl. No.: 13/124,241

(22) PCT Filed: Dec. 24, 2008

(86) PCT No.: PCT/KR2008/007653
§ 371 (c)(1),
(2), (4) Date: Apr. 14, 2011

(87) PCT Pub. No.: WO2010/047437
PCT Pub. Date: Apr. 29, 2010

(65) Prior Publication Data
US 2011/0199724 A1 Aug. 18, 2011

(30) Foreign Application Priority Data
Oct. 20, 2008 (KR) .................. 10-2008-0102539

(51) Int. Cl.
*H05K 7/00* (2006.01)
*H04N 5/64* (2006.01)
(52) U.S. Cl.
CPC ............... *H04N 5/64* (2013.01); *Y10S 345/905* (2013.01)
USPC ............ 361/679.01; 361/679.22; 361/679.02; 345/905; 348/794; 349/58; 349/59

(58) Field of Classification Search
USPC ........ 361/679.01; 345/905; 348/794; 349/58, 349/59
See application file for complete search history.

(56) References Cited

U.S. PATENT DOCUMENTS

2007/0153458 A1* 7/2007 Okimoto et al. ............... 361/681
2008/0297998 A1* 12/2008 Choi ............................. 361/681

FOREIGN PATENT DOCUMENTS

| KR | 10-2002-0053656 | 7/2002 |
| KR | 10-2002-0081744 | 10/2002 |
| KR | 10-2008-0038888 | 5/2008 |

OTHER PUBLICATIONS

International Search Report issued in PCT Application No. PCT/KR2008/007653 dated Mar. 23, 2009.

* cited by examiner

*Primary Examiner* — Robert J Hoffberg
*Assistant Examiner* — Mukund G Patel
(74) *Attorney, Agent, or Firm* — KED & Associates, LLP

(57) ABSTRACT

A display device is provided. The display device includes a display module including an upper glass which forms a front exterior of the display device and is used for displaying images, and a back cover making contact with the upper glass and covering the display module.

9 Claims, 6 Drawing Sheets

DISPLAY DEVICE

TECHNICAL FIELD

The present disclosure relates to a display device.

BACKGROUND ART

Generally, display devices are used to display images. Recently, many display devices having a two-dimensional flat shape have been introduced into the market. Such flat display devices occupy less space owing to its small volume and are light and easy-to-handle, thus attracting many customers.

Such a display device may include a display module for displaying images. Examples of the display module include a plasma display module.

The plasma display module is operated by using light emitted from a fluorescent material excited by ultraviolet rays generated by gas-discharging.

In a typical display device, the plasma display module is protected by front and rear cabinets. That is, the front cabinet forms the front exterior of the display device and covers the plasma display module.

DISCLOSURE OF INVENTION

Technical Problem

Embodiments provide a display device that can be manufactured with fewer components and lower costs.

Embodiments also provide a display device having a neat front side and a slim shape.

Technical Solution

In one embodiment, a display module includes an upper glass which forms a front exterior of the display device and is used for displaying images; and a back cover making contact with the upper glass and covering the display module.

In another embodiment, a display device includes: a display module including an upper glass which forms a front exterior of the display device and is used for displaying images; a back cover covering the display module; and a grounding member configured to ground the back cover and the upper glass.

In further another embodiment, a display device includes: a display module including a glass which forms a front exterior of the display device and is used for displaying images; a back cover grounded to the glass and covering the display module; and a coupling member configured to couple the glass and the back cover.

Advantageous Effects

According to the embodiments, since the back cover is in direct contact with the upper glass of the plasma display module and fixed to the plasma display module, the display device can be manufactured with fewer components and lower costs through fewer processes.

Furthermore, since the upper glass of the plasma display module forms the entire front exterior of the display device, the front exterior of the display device may seem neat, and the screen of the display device may seem bigger.

In addition, since the back cover is grounded on the upper glass through direct contact with the upper glass, the number of connections necessary for electric grounding of the display device can be reduced, and thus the grounding efficiency of the display device can be improved.

MODE FOR THE INVENTION

Reference will now be made in detail to the embodiments of the present disclosure, examples of which are illustrated in the accompanying drawings.

Figure 1:
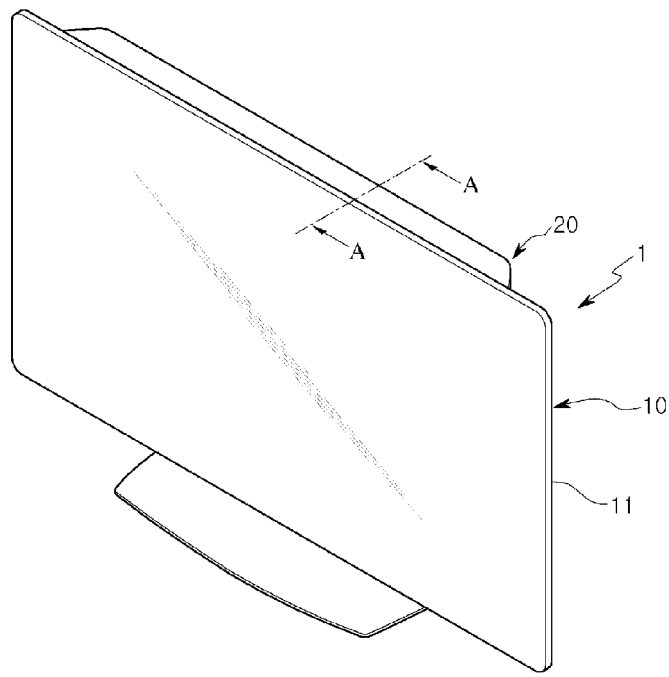
FIG. 1 is a front perspective view illustrating a display device according to a first embodiment.
Figure 2:
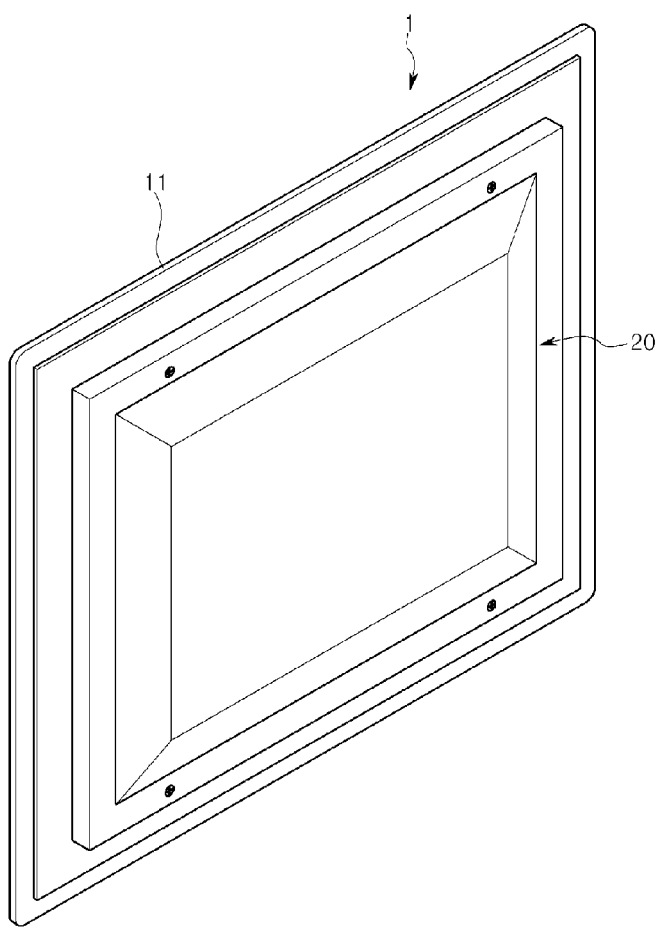
FIG. 2 is a rear perspective view illustrating the display device according to the first embodiment.

FIG. 1 is a front perspective view illustrating a display device according to a first embodiment, and FIG. 2 is a rear perspective view illustrating the display device according to the first embodiment.

Referring to FIGS. 1 and 2, a portion of a plasma display module 10 of the display device 1 forms the front entire exterior of the display device 1.

The plasma display module 10 includes an upper glass 11 forming the entire front exterior of the plasma display module 10. A back cover 20 is grounded to the backside of the upper glass 11 to cover the back portion of the plasma display module 10.

In the current embodiment, the entire exterior of the display device 1 is formed by the upper glass 11 and the back cover 20.

That is, in the current embodiment, an additional front cabinet is not used to protect the plasma display module 10, and the upper glass 11 of the plasma display module 10 is configured to form the entire front exterior of the display device 1.

Figure 3:
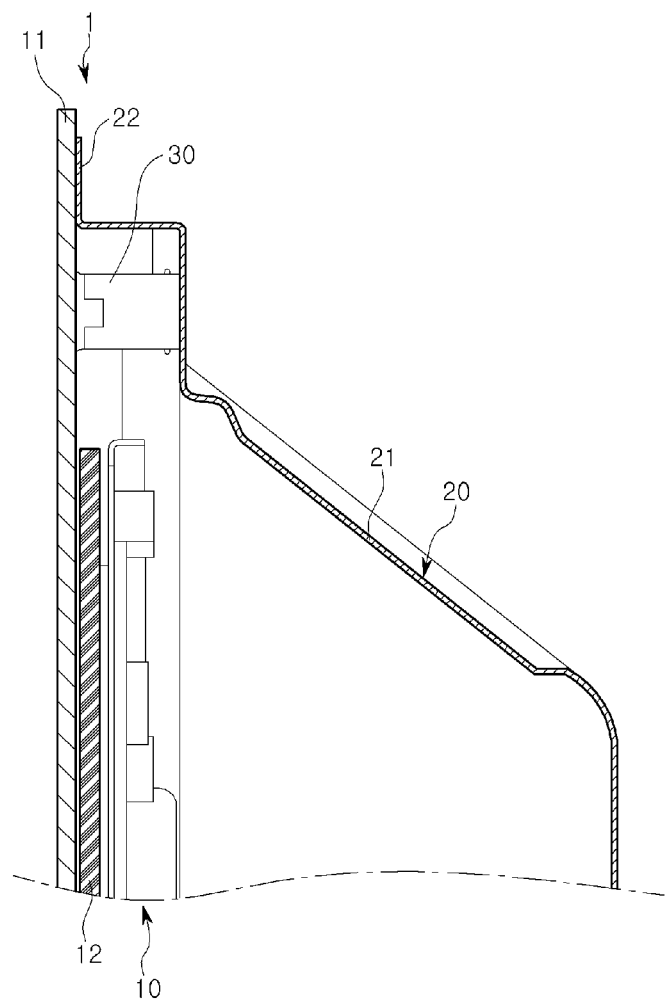
FIG. 3 is a sectional view taken along line A-A of FIG. 1.

FIG. 3 is a sectional view taken along line A-A of FIG. 1.

Referring to FIG. 3, the plasma display module 10 includes the upper glass 11 and a lower glass 12. The upper glass 11 forms the front exterior of the plasma display module 10 and displays images, and the lower glass 12 is disposed at the backside of the upper glass 11.

A scan electrode and a sustain electrode are provided at the upper glass 11, and an address electrode is provided at the lower glass 12.

An upper dielectric layer and a passivation layer are stacked on the upper glass 11 where the scan and sustain electrodes are formed. During plasma discharging, a wall charge is accumulated in the upper dielectric layer. The passivation layer protects the upper dielectric layer from sputtering damage during plasma discharging and increases the efficiency of secondary electron emission. For example, the passivation layer may be formed of a magnesium oxide (MgO).

The address electrode is formed at the lower glass 12 in a direction crossing the scan electrode and sustain electrode. A lower dielectric layer and a barrier wall are formed at the lower glass 12 where the address electrode is formed. A fluorescent layer is formed on the surfaces of the lower dielectric layer and the barrier wall.

General structures of the plasma display module 10 are the same as the structures of a plasma display module of the related art, and thus detailed descriptions thereof will be omitted. Characteristic structures of the plasma display module 10 will be only described according to the current embodiment.

The left-to-right length and up-to-down length of the upper glass 11 are greater than those of the lower glass 12, respectively, so that the back cover 20 can be fixed and grounded to the backside of the upper glass 11. In the current embodiment, the terms left, right, up, and down are used based on FIG. 1.

That is, the back cover 20 is in direct contact with backside edge portions of the upper glass 11. Since the back cover 20 is in direct contact with the backside of the upper glass 11, the back cover 20 can be directly grounded to the upper glass 11.

A plurality of layers, such as an antireflection layer, an optical characteristic layer, an electromagnetic interference (EMI) cutoff layer, and a near infrared ray (NIR) cutoff layer, may be provided on the front surface of the upper glass 11.

That is, in the current embodiment, a glass filter of the related art is not used. Instead, the upper glass 11 itself functions as a glass filter.

The back cover 20 may be formed of a material such as a metal and is in direct contact with the backside edge portions of the upper glass 11.

Alternatively, the back cover 20 may be configured by a plastic body and a conductive material (e.g., aluminum) coated or attached on the inner surface of the plastic body, and the back cover 20 may be grounded to the upper glass 11. That is, in the current embodiment, the back cover 20 can have any structure and be formed of any material as long as the back cover 20 can be grounded to the upper glass 11.

The back cover 20 includes a body part 21 forming the exterior of the back cover 20, and an extension part 22 extending from the body part 21 and making contact with the backside of the upper glass 11.

The extension part 22 extends outward at four edge portions of the upper glass 11, and at least a portion of the extension part 22 faces the backside of the upper glass 11. That is, at least a portion of the extension part 22 is flat and parallel with the backside of the upper glass 11. The extension part 22 is the outermost end part of the back cover 20.

A supporting member 30 may be disposed between the upper glass 11 and the back cover 20 (i.e., at a spaced formed by the upper glass 11 and the back cover 20).

The supporting member 30 may be fixed to the backside of the upper glass 11 using an adhesive member (not shown) or an adhesive (not shown). For example, the adhesive member may be a double-sided tape.

The back cover 20 may be coupled to the supporting member 30 fixed to the upper glass 11 by using coupling members (not shown). For example, the coupling members may be fixed to the supporting member 30 by inserting the coupling members through the back cover 20 from the backside of the back cover 20.

That is, in the current embodiment, since the supporting member 30 is fixed to the plasma display module 10, it can be understood that the back cover 20 makes contact with the backside of the upper glass 11 in a state where the back cover 20 is fixed to the plasma display module 10.

Therefore, according to the current embodiment, since the back cover 20 is in direct contact with the upper glass 11 of the plasma display module 10 and fixed to the plasma display module 10, the display device 1 can be manufactured with fewer components and lower costs through fewer processes.

Furthermore, since the upper glass 11 of the plasma display module 10 forms the entire front exterior of the display device 1, the entire front exterior of the display device 1 is homogeneously flat, so that the front exterior of the display device 1 may seem neat and the screen of the display device 1 may seem bigger.

In addition, since the back cover 20 is grounded on the upper glass 11 through direct contact with the upper glass 11, the number of connections necessary for electric grounding of the display device 1 can be reduced, and thus the grounding efficiency of the display device 1 can be improved.

Figure 4:
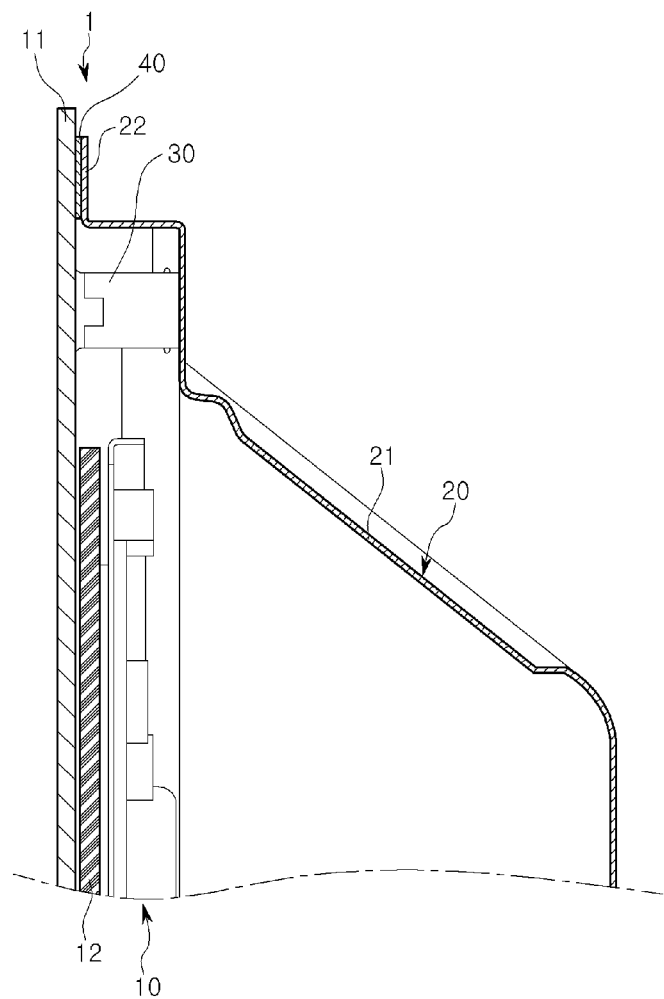
FIG. 4 is a sectional view taken long line A-A of FIG. 1, according to a second embodiment.

FIG. 4 is a sectional view taken long line A-A of FIG. 1, according to a second embodiment.

The current embodiment is the same as the first embodiment except for a grounding member disposed between the upper glass and the back cover. Thus, in the following description of the current embodiment, the characteristic part will be only described.

Referring to FIG. 4, in the current embodiment, a grounding member 40 is provided on the backside of the upper glass 11. The grounding member 40 is fixed to four backside edge portions of the upper glass 11. The grounding member 40 may be fixed to the upper glass 11 using an adhesive member (e.g., a double-sided tape) or an adhesive.

The extension part 22 of the back cover 20 is in contact with the grounding member 40.

The grounding member 40 may be formed of a conductive material such as aluminum or copper. The grounding member 40 may be elastic. For example, the grounding member 40 may be configured by an elastic member (e.g., sponge) and a conductive member (e.g., an aluminum member) surrounding the elastic member.

Therefore, the back cover 20 can be grounded on the backside of the upper glass 11 through the conductive member of the grounding member 40 in a state where the grounding member 40 is elastically movable owing to the elastic member.

That is, in the current embodiment, the back cover 20 is grounded to the upper glass 11 via the grounding member 40.

In the case where the grounding member 40 is elastic, the extension part 22 of the back cover 20 can be wholly brought into contact with the grounding member 40, and thus the grounding efficiency can be improved.

In the current embodiment, the grounding member 40 is fixed to the backside of the upper glass 11; however, the grounding member 40 may be grounded on the backside of the upper glass 11 in a state where the grounding member 40 is fixed to the extension part 22 of the back cover 20.

Figure 5:
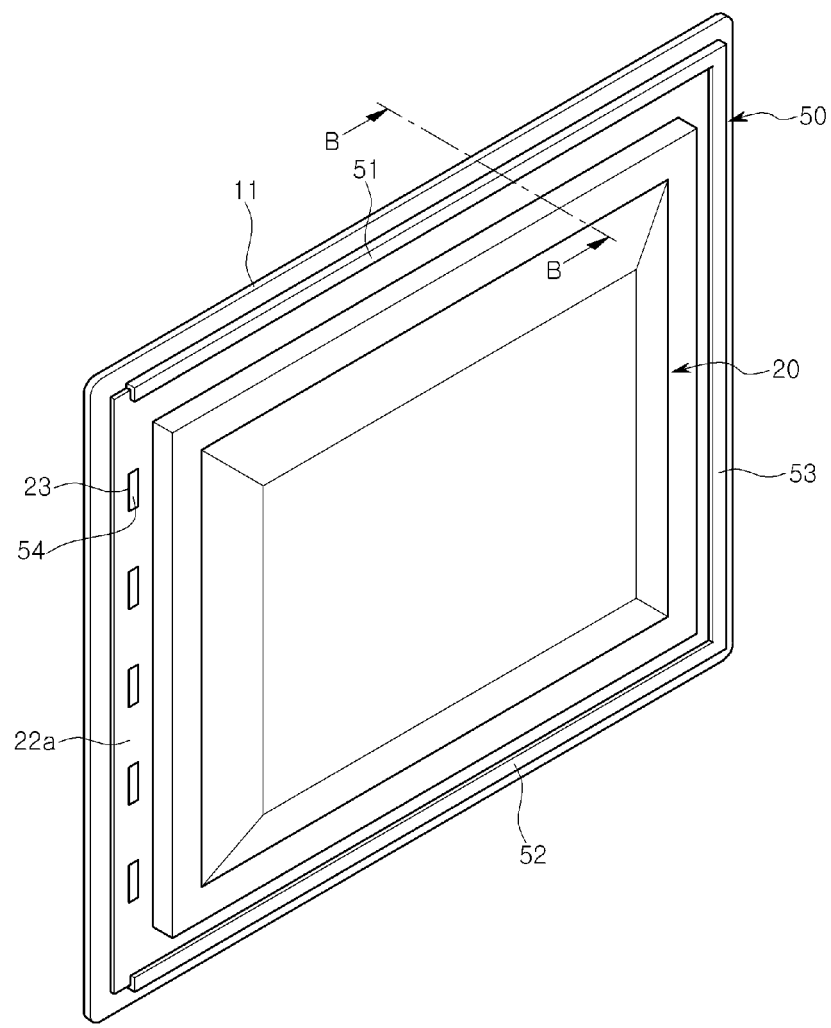
FIG. 5 is a rear perspective view illustrating a display device according to a third embodiment.
Figure 6:
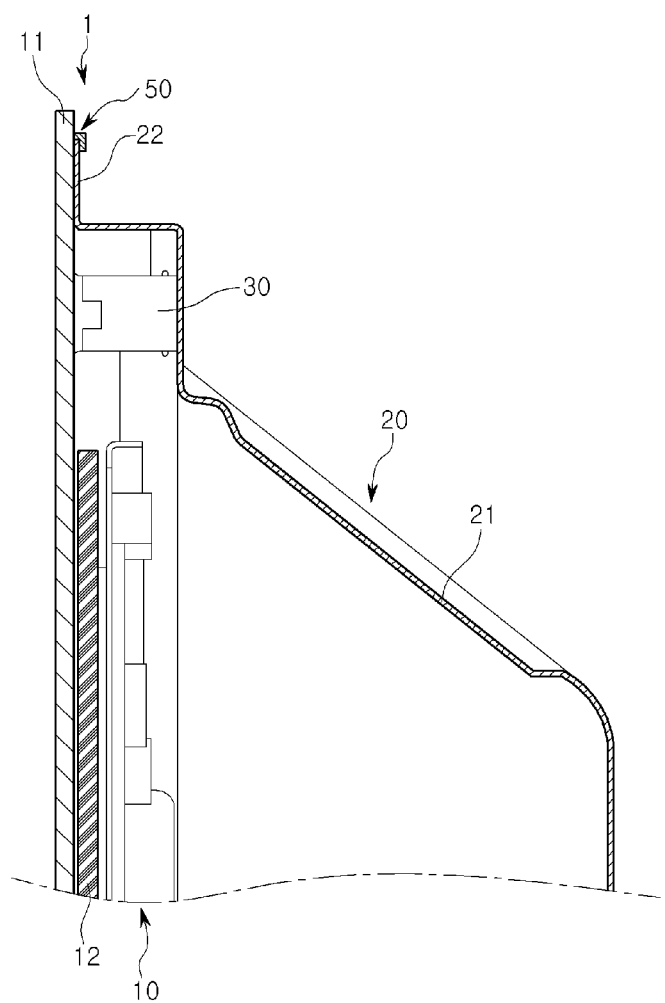
FIG. 6 is a sectional view taken along line B-B of FIG. 5.

FIG. 5 is a rear perspective view illustrating a display device according to a third embodiment, and FIG. 6 is a sectional view taken along line B-B of FIG. 5.

The current embodiment is the same as the first embodiment except for a method of fixing a plasma display module and a back cover. Thus, in the following description, the characteristic feature will be only described.

Referring to FIGS. 5 and 6, in the current embodiment, an upper glass 11 includes a coupling member 50 for coupling with a back cover 20. The coupling member 50 may be fixed to the backside of the upper glass 11 by using an adhesive member (not shown) or an adhesive (not shown).

The coupling member 50 includes upper and lower coupling members 51 and 52 disposed at upper and lower backside edge portions of the upper glass 11, and a lateral coupling member 53 disposed at a right backside edge portion of the upper glass 11 and connected to the upper and lower coupling members 51 and 52. In the current embodiment, the lateral coupling member 53 is disposed at the right backside edge portion of the upper glass 11; however, the lateral coupling member 53 may be disposed at a left backside edge portion of the upper glass 11.

Each of the coupling members 51, 52, and 53 has an L-shaped section. Therefore, an extension part 22 of the back cover 20 can be coupled to the coupling members 51, 52, and 53 by sliding the extension part 22 of the back cover 20 from left to right on the backside of the upper glass 11. When the extension part 22 of the back cover 20 is coupled to the coupling members 51, 52, and 53, two surfaces of the extension part 22 (top and rear surfaces of the extension part 22 in FIG. 6) are surrounded by the coupling members 51, 52, and 53.

A plurality of fixing members 54 are provided on the left backside of the upper glass 11 for fixing the back cover 20 coupled to the coupling members 51, 52, and 53. The fixing members 54 may be vertically arranged at predetermined intervals and fixed to the backside of the upper glass 11 by using an adhesive member or an adhesive.

A plurality of fixing holes 23 are formed in a left extension part 22a of the back cover 20 for receiving the fixing members 54.

Therefore, in a state where the back cover 20 is completely coupled to the coupling members 51, 52, and 53, the fixing members 54 are inserted in the fixing holes 23 so that the position of the back cover 20 can be firmly fixed relative to the upper glass 11. When the position of the back cover 20 is fixed relative to the upper glass 11, the extension part 22 of the back cover 20 makes contact with the backside of the upper glass 11.

In the current embodiment, it will be easily understood that the back cover 20 can be supported by the upper glass 11 owing to the fixing members 54 and the coupling members 51, 52, and 53.

In addition, the back cover 20 can be coupled to a supporting member 30 provided on the backside of the upper glass 11 via coupling members. The coupling of the back cover 20 to the supporting member 30 is the same as that described in the first embodiment, and thus a detailed description thereof will be omitted.

Figure 7:
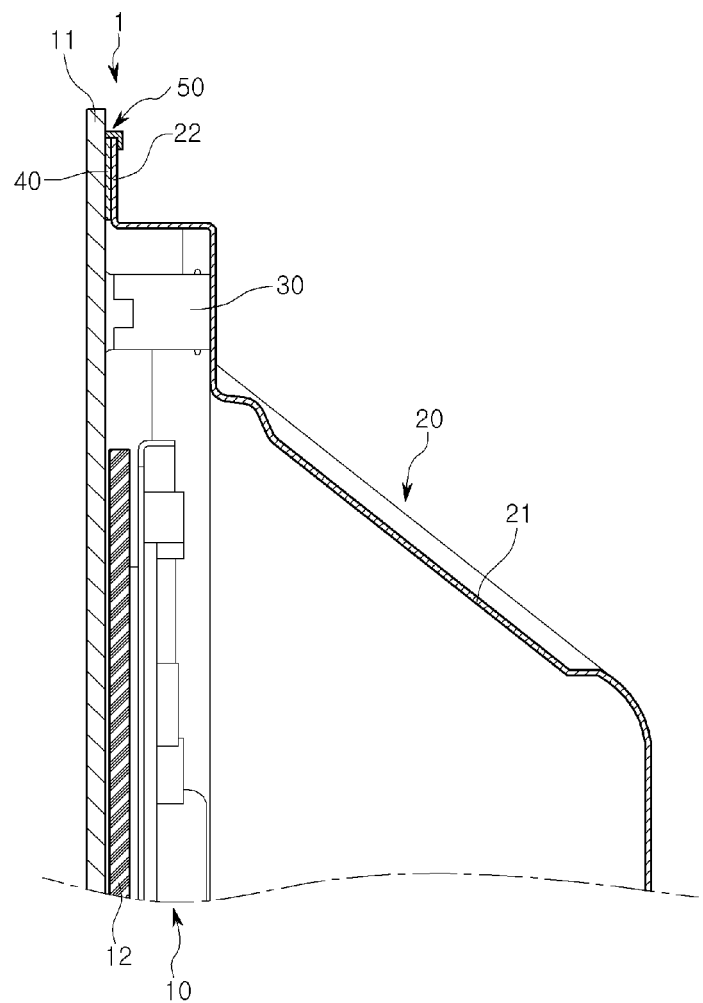
FIG. 7 is a sectional view taken along line B-B of FIG. 5, according to a fourth embodiment.

FIG. 7 is a sectional view taken along line B-B of FIG. 5, according to a fourth embodiment.

The current embodiment is the same as the third embodiment except for a grounding member disposed between the upper glass and the back cover. Thus, in the following description of the current embodiment, the characteristic part will be only described.

Referring to FIG. 7, in the current embodiment, a grounding member 40 is provided on the backside of the upper glass 11. The grounding member 40 is fixed to four backside edge portions of the upper glass 11.

The structure and function of the grounding member 40 are the same as those illustrated in the second embodiment, and thus detailed descriptions thereof will be omitted.

According to the current embodiment, the grounding member 40 is pressed by the extension part 22 of the back cover 20 in a state where the extension part 22 of the back cover 20 is coupled to the coupling members 51, 52, and 53. Therefore, the contact area between the grounding member 40 and the extension part 22 can be increased, and in the case where the grounding member 40 is elastic, the extension part 22 and the coupling members 51, 52, and 53 can be coupled with each other more firmly owing to the resilient force of the grounding member 40.

In the above-described embodiments, the upper and lower glasses are named according to stacked positions thereof; however, when the contact state of the display module and the back cover (e.g., the contact state shown in FIG. 3) is considered, the upper glass can be named as a front glass because the upper glass is disposed at the front side of the lower glass, and the lower glass can be named as a rear glass.

The invention claimed is:

1. A display device comprising:
    a plasma display module comprising an upper glass which forms a front exterior of the display device and a lower glass disposed at a backside of the upper glass, the upper and lower glasses being used for displaying images;
    a back cover making contact with the upper glass and covering at least a portion of the plasma display module,
    a supporting member mounted on a rear surface of the upper glass, the back cover being secured to the supporting member,
        wherein at least one scan electrode and at least one sustain electrode are provided at the upper glass, and at least one address electrode is provided at the lower glass,
    wherein a left-to-right length and an up-to-down length of the upper glass are greater than those of the lower glass,
    wherein the supporting member comprises a first surface that makes contact with a rear surface of the upper glass and a second surface that faces the back cover, and
    wherein an entire surface of the lower glass is spaced apart from the supporting member.

2. The display device according to claim 1, wherein the back cover comprises:
    a body covering a backside of the plasma display module; and
    an extension extending outward from the body and making direct contact with the backside of the upper glass.

3. The display device according to claim 2, wherein at least a portion of the extension is flat and parallel with the backside of the upper glass.

4. The display device according to claim 2, wherein the extension makes contact with our backside edge portions of the upper glass.

5. The display device according to claim 1, wherein at least one of an antireflection layer, an optical characteristic layer, an EMI (electromagnetic interference) cutoff layer, or a NIR (near infrared ray) cutoff layer is disposed on the upper glass.

6. The display device according to claim 1, further comprising a coupling member configured to fix the back cover relative to the upper glass.

7. The display device according to claim 6, wherein the back cover is coupled to the coupling member through a sliding motion.

8. The display device according to claim 1, wherein the back cover is formed of a conductive material.

9. A display device comprising:
    a plasma display module comprising an upper glass which forms a front exterior of the display device and a lower glass disposed at a backside of the upper glass, the upper and lower glasses being used to display images;
    a back cover in contact with the upper glass and covering at least a portion of the plasma display module;
    a supporting member mounted on a rear surface of the upper glass, the back cover being connected to the supporting member;
    wherein a left-to-right length and an up-to-down length of the upper glass are greater than those of the lower glass, and
    wherein the upper glass comprises a front surface which forms a front exterior of the display device, and the lover glass comprises a rear surface which faces with the back cover, wherein at least one electrode is provided at each of the upper and lower glasses used to excite a gas to display the images, wherein an entire surface of the lower glass is spaced apart from the supporting member, wherein the supporting member comprises a first surface that makes contact with a rear surface of the upper glass and a second surface that faces the back cover, and wherein a first distance between the front surface of the upper glass and the rear surface of the lower glass is shorter than a second distance between the first and second surfaces of the supporting member.

* * * * *